United States Patent
Fu et al.

(10) Patent No.: US 11,121,939 B2
(45) Date of Patent: Sep. 14, 2021

(54) METHOD AND DEVICE FOR GENERATING CDN COVERAGE SCHEME, AND COMPUTER-READABLE STORAGE MEDIUM AND COMPUTER DEVICE THEREOF

(71) Applicant: GUIZHOU BAISHANCLOUD TECHNOLOGY CO., LTD., Guiyang (CN)

(72) Inventors: Lijia Fu, Guiyang (CN); Hui Miao, Guiyang (CN)

(73) Assignee: GUIZHOU BAISHANCLOUD TECHNOLOGY CO., LTD., Guiyang (CN)

( * ) Notice: Subject to any disclaimer, the term of this patent is extended or adjusted under 35 U.S.C. 154(b) by 0 days.

(21) Appl. No.: 16/605,984

(22) PCT Filed: Jun. 28, 2018

(86) PCT No.: PCT/CN2018/093365
§ 371 (c)(1),
(2) Date: Oct. 17, 2019

(87) PCT Pub. No.: WO2019/001514
PCT Pub. Date: Jan. 3, 2019

(65) Prior Publication Data
US 2020/0052980 A1   Feb. 13, 2020

(30) Foreign Application Priority Data
Jun. 29, 2017   (CN) .......................... 201710517928.0

(51) Int. Cl.
*H04L 12/24*   (2006.01)
*H04L 29/08*   (2006.01)

(52) U.S. Cl.
CPC ...... *H04L 41/5009* (2013.01); *H04L 41/0816* (2013.01); *H04L 41/0893* (2013.01); *H04L 67/322* (2013.01)

(58) Field of Classification Search
None
See application file for complete search history.

(56) References Cited

U.S. PATENT DOCUMENTS

| 8,060,616 B1 | 11/2011 | Richardson et al. | |
| 2011/0194456 A1* | 8/2011 | Fordham | H04L 41/145 370/254 |

(Continued)

FOREIGN PATENT DOCUMENTS

| CN | 101242422 A | 8/2008 |
| CN | 101959054 A | 1/2011 |

(Continued)

OTHER PUBLICATIONS

The World Intellectual Property Organization (WIPO) International Search Report for PCT/CN2018/093365 dated Sep. 7, 2018 7 Pages.

(Continued)

*Primary Examiner* — Scott B Christensen
(74) *Attorney, Agent, or Firm* — Anova Law Group PLLC

(57) ABSTRACT

A method for generating a content delivery network (CDN) coverage scheme includes determining that a target area meets a node quality re-evaluation condition, calculating node quality evaluation data in the target area, calculating an area coverage list according to the node quality evaluation data and one or more node coverage parameters, and generating a coverage scheme of the target area according to the area coverage list and one or more area coverage parameters.

17 Claims, 2 Drawing Sheets

(56) References Cited

U.S. PATENT DOCUMENTS

| | | | |
|---|---|---|---|
| 2014/0269269 A1* | 9/2014 | Kowali | H04W 24/04 370/229 |
| 2015/0207695 A1 | 7/2015 | Robert et al. | |
| 2016/0134906 A1 | 5/2016 | James et al. | |
| 2017/0094006 A1 | 3/2017 | Wistow | |
| 2017/0099210 A1* | 4/2017 | Fardid | H04L 43/08 |
| 2017/0111206 A1* | 4/2017 | Rajapakse | H04L 43/0864 |

FOREIGN PATENT DOCUMENTS

| | | |
|---|---|---|
| CN | 101984624 A | 3/2011 |
| CN | 102368776 A | 3/2012 |
| CN | 103746934 A | 4/2014 |
| CN | 104270291 A | 1/2015 |
| CN | 104519080 A | 4/2015 |
| CN | 104994123 A | 10/2015 |
| CN | 105634784 A | 6/2016 |
| CN | 106131229 A | 11/2016 |
| CN | 106533762 A | 3/2017 |
| CN | 106603341 A | 4/2017 |
| CN | 106656611 A | 5/2017 |
| CN | 106790482 A | 5/2017 |
| CN | 107707378 A | 2/2018 |
| CN | 107707379 A | 2/2018 |

OTHER PUBLICATIONS

Le Chen, "Research on method for Metropolitan Area Network Collaborative Planning", Telecommunications Technology, No. 10, Oct. 31, 2015, ISSN: 1000-1247, pp. 7-11, and English translation of the abstract.

Yunsong Deng, "Construction and Deployment for CND Node of China Telecom YueMe-OTT in Hainan", Computer Knowledge and Technology, vol. 12, No. (16), Jun. 30, 2016, ISSN: 1009-3044, pp. 46-48, and English translation of the abstract.

Intellectual Property India Examination Report for IN Application No. 201927037403 dated Aug. 1, 2021 6 pages.

Intellectual Property Office of Singapore Invitation to Respond to Written Opinion, the Search Report and Written Opinion for SG Application No. 11201908014V dated Apr. 25, 2020 11 pages.

Intellectual Property Office of Singapore The Second Written Opinion for SG Application No. 11201908014V dated Nov. 25, 2020 7 pages.

* cited by examiner

METHOD AND DEVICE FOR GENERATING CDN COVERAGE SCHEME, AND COMPUTER-READABLE STORAGE MEDIUM AND COMPUTER DEVICE THEREOF

CROSS-REFERENCE TO RELATED APPLICATIONS

The present application is a national stage entry under 35 U.S.C. § 371 of International Application No. PCT/CN2018/093365, filed on Jun. 28, 2018, which claims priority to Chinese Patent Application No. 201710517928.0 filed to China National Intellectual Property Administration on Jun. 29, 2017 and entitled "METHOD AND DEVICE FOR GENERATING CDN COVERAGE SCHEME", the entire contents of both of which are hereby incorporated by reference.

TECHNICAL FIELD

Embodiments of the present invention relate to but are not limited to the technical field of Internet, and in particular to a method and device for generating a CDN coverage scheme, and a computer-readable storage medium and computer device thereof.

BACKGROUND

With the development of Internet, the Content Delivery Network (CDN) already exists in the network service as a necessary link in the network access.

Currently, the maintenance mode of CDN coverage schemes is basically configured manually, resulting in problems such as heavy workload, low adjustment efficiency, high artificial failure rate and unreasonable coverage scheme configuration. Consequently, the service quality and the maintenance convenience of the CDN will be influenced.

The CDN coverage scheme is mapping relationships between network areas and IPs of network servers. By applying the mapping relationships and an IP library (the mapping relationships of terminal IP/LDNS exit IPs and the network areas), the scheduling module of the CDN guides a specified terminal access to an optimal network server, so that the purpose of intelligent scheduling is achieved.

The prior art has the following disadvantages:

I. the manual maintenance of the CDN coverage schemes will result in heavy workload, low adjustment efficiency and high artificial failure rate; and II. there is no perfect service quality evaluation standard of Internet users' access covered by network server IP, and the service scheme configuration is unreasonable, and the CDN service quality is influenced.

SUMMARY OF THE PRESENT INVENTION

The embodiments of the present invention are intended to solve the problems described above.

In accordance with one aspect of the embodiments of the present invention, a method for generating a CDN coverage scheme is provided, including:

when it is determined that a target area meets node quality re-evaluation conditions, calculating node quality evaluation data in the target area; calculating an area coverage list according to the node quality evaluation data and node coverage parameters; and, generating, according to the area coverage list and area coverage parameters, a coverage scheme of the target area.

The method for generating a CDN coverage scheme is further characterized in that:

the target area meeting node quality re-evaluation conditions refers to one of the following situations:

I. CDN coverage scheme initialization information is received, and the CDN coverage scheme is triggered to execute an initialization task;

II. there is a newly added node in the target area; and

III. a service quality of the target area is lower than a preset quality condition.

The method for generating a CDN coverage scheme is further characterized in that:

the calculating node quality evaluation data in the target area includes:

evaluating IPs of nodes in the target area by a preset evaluation method, calculating quality data of the IPs, calculating an average value of quality data of all IPs subordinate to each node in each network area of the target area to serve as quality evaluation data of each node in this network area, and combining the quality evaluation data of the nodes to obtain node evaluation data in the target area.

The method for generating a CDN coverage scheme is further characterized in that:

the preset evaluation method and the corresponding quality data of the IP are at least one of the following:

I. when an evaluation method 1 is to perform PING detection on the IP by a detection proxy, the quality data of the IP is a PING parameter;

II. when an evaluation method 2 is to configure the IP to the target area by a third-party test platform to provide service, the quality data of the IP is third-party performance and third-party availability; and III. when an evaluation method 3 is to configure the IP to a preset test link or a preset resource to serve the target area, the quality data of the IP is gray level performance and gray level availability.

The method for generating a CDN coverage scheme is further characterized in that:

the calculating an area coverage list according to the evaluation data and the node coverage parameters includes:

determining, according to the evaluation data and the node coverage parameters, a servable node list in each network area of the target area, and combining the servable node list and a IP list of each node in the servable node list to form the area coverage list.

The method for generating a CDN coverage scheme is further characterized in that:

the node coverage parameters include a quality score parameter of each network area, a quality standard of each network area, the minimum number of serving IPs of each network area and a node IP list; and the determining, according to the evaluation data and node coverage parameters, a servable node list of the target area includes:

executing step 1, step 2 and step 3 for each network area:

step 1: calculating, according to the evaluation data and the quality score parameter of each network area, a quality score of each node in each network area;

step 2: acquiring, according to the quality score of each node in the network area as well as the quality standard of each network area, a coverage node list and a quality score of each network area; and step 3: for a network area with the number of IPs greater than the minimum number of serving IPs of this network area, calculating, according to the node list of each network area and the number of IPs of each node in a node device list, a node list of the network area and an IP list of each node in the node device list, succeeding the node quality score to the IP list in the node to obtain an area coverage list of this network area.

The method for generating a CDN coverage scheme is further characterized in that:

the node coverage parameters include a quality score parameter of each network area, the number of main and backup layers and the quality standard of each network area, the minimum number of serving IPs of each network area and a node IP list; and the determining, according to the evaluation data and node coverage parameters, a servable node list of the target area includes:

executing step 1, step 2 and step 3 for each network area:

step 1: calculating, according to the evaluation data and the quality score parameter of each network area, a quality score of each node in each network area;

step 2: acquiring, according to the quality score of each node in the network area as well as the number of main and backup layers and the quality standard, a coverage node list and a score of each layer of each network area; and step 3: for a network area with the number of IPs of each layer greater than the minimum number of serving IPs of this network area, calculating, according to the node list of each layer of each network area and the number of IPs of each node in the node device list, a node list of a specified layer of the network area and an IP list of each node in the node device list, succeeding the node quality score to the IP list in the node to obtain an area coverage list of this network area.

The method for generating a CDN coverage scheme is further characterized in that:

the area coverage parameters include a coverage scheme, an area bandwidth capacity and a node bandwidth capacity; and the generating, according to the area coverage list and the area coverage parameters, a coverage scheme of the target area includes: selecting, in a specified order and from the area coverage list, a node coverage having the highest quality score until the node bandwidth capacity corresponding to the selected node is greater than the area bandwidth capacity, wherein the specified order comprise provinces of a same ISP, districts of a same ISP, a same ISP and different ISPs.

In accordance with another aspect of the embodiments of the present invention, a device for generating a CDN coverage scheme is provided, including:

a configuration management module, configured to: when it is determined that a target area meets node quality re-evaluation conditions, transmit an evaluation task to a node quality evaluation module, transmit node coverage parameters to an area coverage operation module, and transmit area coverage parameters to a coverage scheme operation module;

the node quality evaluation module, configured to calculate, upon receiving the evaluation task, node quality evaluation data in the target area;

the area coverage operation module, configured to calculate an area coverage list according to the node quality evaluation data and the node coverage parameters; and the coverage scheme operation module, configured to generate, according to the area coverage list and the area coverage parameters, a coverage scheme of the target area.

The device for generating a CDN coverage scheme is further characterized in that:

the device further includes an initialization module, a resource management module and a big data analysis module which are connected to the configuration management module;

the initialization module is configured to transmit CDN coverage scheme initialization information to the configuration management module when it is necessary to perform CDN coverage scheme initialization;

the resource management module is configured to transmit a node configuration task to the configuration management module when there is a newly added node in the target area, wherein the node configuration task contains node configuration change information; and the big data analysis module is configured to transmit a network area reset task to the configuration management module when the service quality of the target area is lower than a preset quality condition.

The device for generating a CDN coverage scheme is further characterized in that:

the node quality evaluation module is configured to calculate node quality evaluation data in the target area by the following method: evaluating IPs of nodes in the target area by a preset evaluation method, calculating quality data of the IPs, calculating an average value of quality data of all IPs subordinate to each node in each network area of the target area to serve as quality evaluation data of each node in this network area, and combining the quality evaluation data of the nodes to obtain node evaluation data in the target area.

The device for generating a CDN coverage scheme is further characterized in that:

the preset evaluation method and the corresponding quality data of the IP are at least one of the following:

I. when an evaluation method 1 is to perform PING detection on the IP by a detection proxy, the quality data of the IP is a PING parameter;

II. when an evaluation method 2 is to configure the IP to the target area by a third-party test platform to provide service, the quality data of the IP is third-party performance and third-party availability; and III. when an evaluation method 3 is to configure the IP to a preset test link or a preset resource to serve the target area, the quality data of the IP is gray level performance and gray level availability.

The device for generating a CDN coverage scheme is further characterized in that:

the area coverage operation module is configured to calculate an area coverage list according to the evaluation data and the node coverage parameters by the following method: determining, according to the evaluation data and the node coverage parameters, a servable node list in each network area of the target area, and combining the servable node list and a IP list of each node in the servable node list to form the area coverage list.

The device for generating a CDN coverage scheme is further characterized in that:

the node coverage parameters include a quality score parameter of each network area, a quality standard of each network area, the minimum number of serving IPs of each network area and a node IP list; and the area coverage operation module is configured to determine, according to the evaluation data and node coverage parameters, a servable node list of the target area by the following method:

executing step 1, step 2 and step 3 for each network area:

step 1: calculating, according to the evaluation data and the quality score parameter of each network area, a quality score of each node in each network area;

step 2: acquiring, according to the quality score of each node in the network area as well as the quality standard of each network area, a coverage node list and a quality score of each network area; and step 3: for a network area with the number of IPs greater than the minimum number of serving IPs of this network area, calculating, according to the node list of each network area and the number of IPs of each node in a node device list, a node list of the network area and an IP list of each node in the node device list, succeeding the node quality score to the IP list in the node to obtain an area coverage list of this network area.

The device for generating a CDN coverage scheme is further characterized in that:

the node coverage parameters include a quality score parameter of each network area, the number of main and backup layers and the quality standard of each network area, the minimum number of serving IPs of each network area and a node IP list; and the area coverage operation module is configured to determine, according to the evaluation data and node coverage parameters, a servable node list of the target area by the following method:

executing step 1, step 2 and step 3 for each network area:

step 1: calculating, according to the evaluation data and the quality score parameter of each network area, a quality score of each node in each network area;

step 2: acquiring, according to the quality score of each node in the network area as well as the number of main and spare layers and the quality standard, a coverage node list and a score of each layer of each network area; and step 3: for a network area with the number of IPs of each layer greater than the minimum number of serving IPs of this network area, calculating, according to the node list of each layer of each network area and the number of IPs of each node in the node device list, a node list of a specified layer of the network area and an IP list of each node in the node device list, succeeding the node quality score to the IP list in the node to obtain an area coverage list of this network area.

The device for generating a CDN coverage scheme is further characterized in that:

the area coverage parameters include a coverage scheme, an area bandwidth capacity and a node bandwidth capacity; and the coverage scheme operation module is configured to generate, according to the area coverage list and the area coverage parameters, a coverage scheme of the target area by the following method: selecting, in a specified order and from the area coverage list, a node coverage having the highest quality score until the node bandwidth capacity corresponding to the selected node is greater than the area bandwidth capacity, wherein the specified order comprise provinces of a same ISP, districts of a same ISP, a same ISP and different ISPs.

In accordance with another aspect of the embodiments of the present invention, a computer-readable storage medium is provided, stored with computer programs that, when executed by a processer, implement the steps in the method described above.

In accordance with another aspect of the embodiments of the present invention, a computer device is provided, including a memory, a processor and computer programs that are stored on the memory and can be run on the processor, the processor implementing the steps in the method described above when executing the programs.

The present invention has the following advantages.

Firstly, the present invention achieves the automatic generation of a CDN coverage scheme; and, one needs only to manually maintain the network server IP list, the network area list, node coverage parameters, area bandwidth capacity, and node bandwidth capacity, in order to automatically compute an optimal coverage scheme. The cost of manual maintenance is reduced by 60%, and efficiency is increased by 100%.

Secondly, the invention also implements a terminal access service quality-based system for evaluating a network-server node coverage network area, improving the service quality by 3%.

Other characteristics, features and advantages of the embodiments of the present invention will become apparent by reading the following descriptions of exemplary embodiments with reference to the drawings.

BRIEF DESCRIPTION OF THE DRAWINGS

The drawings, which are incorporated into this specification and constitute a part of this specification, show the embodiments of the present invention and are used with the descriptions to explain the principle of the embodiments of the present invention. Throughout the drawings, like reference numerals indicate like elements. The drawings described below are some but not all of the embodiments of the present invention. A person of ordinary skill in the art can obtain other drawings according to these drawings without paying any creative effort.

DETAILED DESCRIPTION OF THE EMBODIMENTS

To make the objectives, technical solutions and advantages of the embodiments of the present invention clearer, the technical solutions in the embodiments of the present invention will be clearly and completely described below with reference to the drawings in the embodiments of the present invention. Apparently, the embodiments described herein are some but not all of the embodiments of the present invention. All other embodiments obtained by a person of ordinary skill in the art without paying creative effort shall fall into the protection scope of the embodiments of the present invention. It is to be noted that the embodiments in the present application and the features in the embodiments can be combined with each other if not conflicted.

Figure 1:
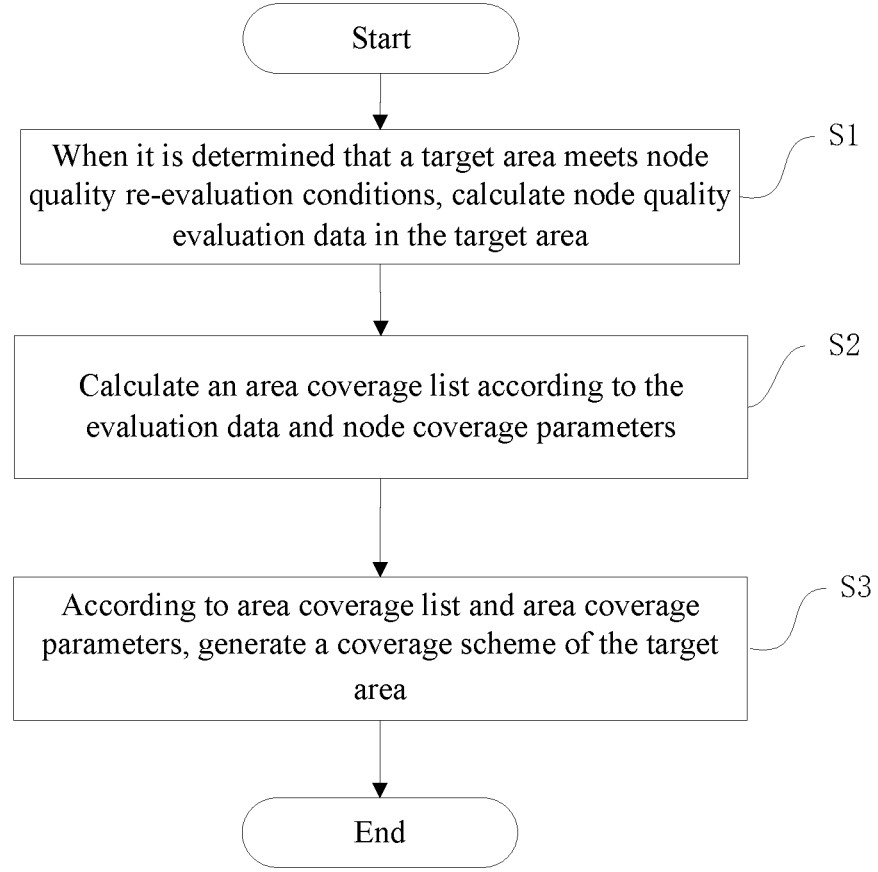
FIG. 1 is flowchart of a method for generating a CDN coverage scheme according to an embodiment.

FIG. 1 is a flowchart of a method for generating a CDN coverage scheme according to an embodiment. The method for generating a CDN coverage scheme includes the following steps.

Step 101: When it is determined that a target area meets node quality re-evaluation conditions, node quality evaluation data in the target area is calculated.

Step 102: An area coverage list is calculated according to the node quality evaluation data and node coverage parameters.

Step 103: A coverage scheme of the target area is generated according to the area coverage list and the area coverage parameters.

In this method, after the coverage scheme of the target are is generated, this coverage scheme will be automatically issued, so that a module responsible for scheduling performs scheduling according to this coverage scheme.

Wherein, in this method, the target area is in unit of network areas. The target area may include at least one network area, for example, China Unicom-Beijing, China Telecom-Shanghai and China Mobile-Guangdong are three network areas. The target area may include one or more network areas.

In the step 101, the target area meeting node quality re-evaluation conditions means that one of the following conditions is met.

Condition 1: CDN coverage scheme initialization information is received, and the CDN coverage scheme is triggered to execute an initialization task. The CDN coverage scheme initialization information may be manually configured and triggered information, or may be information triggered by a scheduling module that is responsible for executing the scheduling of CDN coverage schemes.

Condition 2: there is a newly added node in the target area. Specifically, a node reset task will be triggered when a node list is manually changed. In the changed node list, each node has a unique name. For example, the format of the node name is: Internet Service Provider (ISP)-Province-City-Machine room No.-Equipment No.

When the node list is changed, the contents of the changes may include at least one of the following changes:

the types of the changes, include: node addition, node cancellation, node IP change, and node bandwidth capacity change. The node addition refers to the addition of a new node. It is possible that an empty node (i.e., a node without IP) is newly addition; or, it is also possible that the newly added node has a certain number of IPs. The node cancellation refers to the deletion of a certain node. If this node has IPs, all IPs subordinate to this node are also deleted. The term "IP" is the abbreviation of "Internet Protocol" and, in this disclosure, refers to IP address unless otherwise specified.

The node IP change refers that, in a case where no node is added or cancelled, IPs subordinate to a certain node are changed, including the addition or reduction of IPs.

The node bandwidth capacity change refers to the change in bandwidth capacity of a node, in unit of M. When the bandwidth capacity of the node is not changed, this item is marked with 0.

Example 1

A node node1 is newly added, two IPs subordinate to this node include ip1 and ip2, and the bandwidth allocated to this node is 1000 M. The format of the node reset task is as follows:

| Node name | Type of change | IP change | Capacity change |
| --- | --- | --- | --- |
| node1 | Node addition | ip1, ip2 | 1000 |

Example 2

A node node1 is cancelled, two IPs subordinate to this node include ip1 and ip2, and the bandwidth is 1000 M. The format of the node reset task is as follows

| Node name | Type of change | IP change | Capacity change |
| --- | --- | --- | --- |
| node1 | Node cancellation | ip1, ip2 | −1000M |

Example 3

The IP number of node node1 is expanded, ip3 is added, and the bandwidth remains unchanged. The format of the node reset task is as follows:

| Node name | Type of change | IP change | Capacity change |
| --- | --- | --- | --- |
| node1 | Node IP change | +ip3 | 0M |

Example 4

The bandwidth of node1 is reduced, the IPs subordinate to this node remain unchanged, and the bandwidth is reduced by 20 M. The format of the node reset task is as follows:

| Node name | Type of change | IP change | Capacity change |
| --- | --- | --- | --- |
| node1 | Node bandwidth capacity change | 0 | −20M |

Condition 3: the service quality of the target area is lower than a preset quality condition.

In this method, an access log of a network server and a request log of a client terminal are calculated in real time, and a service quality score of each network area (generally ISP-Province) is calculated in real time. When the service quality scores of one or more network areas are lower than the preset quality condition, the one or more network areas are used as target areas, and coverage scheme recalculation of these target areas is triggered.

In the step 101, the calculating node quality evaluation data in the target area includes the following steps:

Step 1011: IPs of the nodes in the target area are evaluated by using a preset evaluation method, and quality data of the IPs is calculated.

The evaluation method is one of the following method:

Evaluation method 1: PING detection is performed on IPs by a detection proxy to obtain PING parameters of the target area.

Evaluation method 2: performance quality parameters of IPs are obtained from a third-party test platform.

Evaluation method 3: the IPs are configured to a preset test link or a preset resource to serve this target area so as to acquire service parameters.

In this step, evaluation may be performed by a fixed evaluation method. It is also possible to create and set an evaluation task. The evaluation task includes an evaluation method. The format of the evaluation task includes: node name, IP list and evaluation method.

In this step, the calculating, according to the evaluation task, node quality evaluation data in the target area includes the following steps.

a. The evaluation task is parsed to extract IPs to be detected and an evaluation method.

b. Each IP to be detected is evaluated by the evaluation method indicated in the evaluation task. Specifically:

the preset evaluation method and the corresponding quality data of IPs are one of the following:

I. when the evaluation method 1 is to perform PING detection on IPs by a detection proxy, the quality data of the IPs are PING parameters;

II. when the evaluation method 2 is to configure IPs to provide services to the target area by a third-party test platform, the quality data of the IPs is service performance data of the target area; and III. the evaluation method 3 is to configure IPs to a preset test link or a preset resource to serve the target area, the quality data of the IPs is service performance data of the target area.

When the evaluation method 1 is used, PING detection is performed on IPs to be detected by a detection proxy in each network area (where the detection period and the detection times are fixed by the module and may be modified manually) to obtain PING parameters (including delay data of PING, a packet loss rate, variance data and the like) of the IPs to be detected in each network area, as quality data of the IPs.

When the evaluation method 2 is used, IPs are configured to provide services to the target area by a third-party test platform. Data acquisition can be performed per fixed time period (which may be self-defined), so that third-party performance and third-party availability of the IPs to be detected in each network area are obtained as the quality data of the IPs.

When the evaluation method 3 is used, IPs are configured to a preset test link or a preset resource to serve the target area, and gray level performance and gray level availability of the IPs to be detected in each network area are obtained as the quality data of the IPs.

Step 1012: an average value of quality data of all IPs subordinate to each node in each network area of the target areas is calculated as quality evaluation data of this node in this network area.

When the evaluation method 1 is used, the delay of the node PING in the target area is equal to a quotient of the delay of IPs in the node in each network area of the target areas and the number of IPs. The same is suitable for the calculation of other indexes.

Step 1013: The quality evaluation data of the nodes are combined to obtain node evaluation data in the target area.

For example, when the target area includes only one network area, i.e., China Unicom-Beijing and the evaluation methods 1, 2 and 3 are used, the format of the evaluation data includes: network area, node name, ping delay, ping packet loss, ping variance, third-party performance, third-party availability, gray level performance and gray level availability. The value of the specific evaluation data is: China Unicom-Beijing, node1, 25, 1%, 1, 1, 100%, 2 and 100%.

In the step 102, the calculating an area coverage list according to the evaluation data and node coverage parameters specifically includes the following steps:

The node coverage parameters have two forms. In the first form, the node coverage parameters include the following:

1. Quality Score Parameters of Each Network Area

For example, the format is as follows:

| Network area | Ping delay | Ping packet loss | Ping variance | Third-party performance | Third-party availability | Gray level performance | Gray level availability |
|---|---|---|---|---|---|---|---|
| China Unicom-Beijing | 20 | 1% | 1 | 1 | 100% | 1 | 100% |

2. The Minimum Number of Serving IPs in Each Network Area

For example, the format is as follows:

| Network area | The minimum number of serving IPs |
|---|---|
| China Unicom-Beijing | 10 |
| China Telecom-Shanghai | 20 |

Node IP List

For example, the format is as follows:

| Node name | IP list | The number of IPs |
|---|---|---|
| Node1 | 1.1.1.1, 1.1.1.2 | 2 |

Quality Standard of Each Network Area

For example, the format is as follows:

| Network area | Quality standard |
|---|---|
| China Unicom-Beijing | 150 |

The determining, according to the evaluation data and node coverage parameters, a servable node list in the target area includes the following steps:

Step 1, step 2 and step 3 are executed for each network area.

Step 1: A quality score of each node in each network area is calculated according to the evaluation data and the quality score parameter of each network area. When the evaluation type of the evaluation data is that the evaluation data is greater than the quality score parameter, an expression is as follows:

Quality score=Σeach piece of quality data(evaluation data−quality score parameter)/parameter corresponding to quality score+100

When the evaluation type of the evaluation data is that the evaluation data is less than the quality score parameter, (evaluation data−quality score parameter) in the above equation is (quality score parameter−evaluation data).

Thus, the quality score of a certain node in a specified network area is obtained, for example:

| Network area | Node name | Quality score |
|---|---|---|
| China Unicom-Beijing | node1 | 101 |

Step 2: A coverage node list and a quality score of each network area are obtained according to the quality score of each node in each network area as well as the quality standard of each network area.

Step 3: For a network area with the number of IPs greater than the minimum number of serving IPs of this network area, a node list of the network area and an IP list of each node in a node device list are calculated according to the node list of each network area and the number of IPs of each node in the node device list, and the node quality score is succeeded to the IP list in the node to obtain an area coverage list of this network area.

The area coverage lists of the network areas are combined to obtain a final area coverage list.

Before the step 1, the method further includes: determining whether the evaluation data and the node coverage parameters are changed. The determination method is as follows: comparing the evaluation data and the node coverage parameters with the local data to obtain differences. If there are differences, the process will be continuously executed; and, if there are no differences, no processing is performed.

In the second form, the node coverage parameters include:
1. a quality score parameter of each network area;
2. the minimum number of serving IPs in each network area;
2. the minimum number of serving IPs in each network area;
4. the number of main and backup layers and the quality standard.

For example, the format is as follows:

| Network area | The number of main and backup layers | Quality standard |
|---|---|---|
| China Unicorn-Beijing | 3 | 150, 100, 90 |

The determining, according to the evaluation data and node coverage parameters, a servable node list in the target area includes the following steps:

Step 1, step 2 and step 3 are executed for each network area.

Step 1: A quality score of each node in each network area is calculated according to the evaluation data and the quality score parameter of each network area. Step 2: A coverage node list and a quality score of each layer of each network area are obtained according to the quality score of each node in the network area as well as the number of the main and backup layers and the quality standard of the network area. A node having a quality standard value greater than or equal to that of the layer 1 serves as a main serving node, and a node having a quality standard value greater than that of the layer N serves as a serving node of the Nth backup layer.

Step 3: For a network area with the number of IPs in each layer greater than the minimum number of serving IPs of this network area, a node list of a specified layer of the network area and an IP list of each node in a node device list are calculated according to the node list of each layer of each network area and the number of IPs of each node in the node device list, and the node quality score is succeeded to the IP list in the node to obtain an area coverage list of this network area.

The area coverage lists of the network areas are combined to obtain a final area coverage list.

In the step 3, when the number of IPs in each layer of the network area is not greater than the minimum number of serving IPs of this network area, an alarm is given out.

In the step 103, the generating, according to the area coverage list and the area coverage parameters, a coverage scheme of the target area includes: the area coverage parameters including a coverage scheme, area bandwidth capacity and node bandwidth capacity; and, the generating, according to the area coverage list and the area coverage parameters, a coverage scheme of the target area includes: selecting, in a specified order and from the area coverage list, a node coverage having the highest quality score until the node bandwidth capacity corresponding to the selected node is greater than the area bandwidth capacity, wherein the specified order includes provinces of a same ISP, districts of a same ISP and different ISPs.

For example, the step 103 specifically includes the following steps.

a. A network area covered by a same ISP-province node is selected for serving.

Servicing nodes and IPs of a first layer of each network area are acquired. If a node having the highest quality score and the network area are a unified "ISP-province" area and the sum of node bandwidth capacities is greater than the area bandwidth capacity, this network area is directly covered by a same ISP-province node, and the area bandwidth capacity is allocated to each node according to the proportion of the number of IPs of the serving nodes, and this bandwidth value is subtracted from the bandwidth capacity of the related node. The operation of the coverage scheme for the first layer of this network area ends.

b. A network area covered by a same ISP-district node is selected for serving.

Serving nodes and IPs of first layers of the remaining network areas are acquired, if a node having the highest quality score is to be served by a network area with "same ISP-district" or "same ISP-province+same ISP-district" under the premise that the area bandwidth capacity is met, this network area is directly covered by the same ISP-province node, and the area bandwidth capacity is allocated to each node according to the proportion of the number of IPs of the serving nodes. This bandwidth value is subtracted from the bandwidth capacity of the related node, and alarm data is sent to a monitoring and alarming module. The monitor data is "network area nodes serving across the ISP-province". The operation of the coverage scheme for the first layer of this network area ends.

c. A network area covered by a same ISP node is selected for serving.

Serving nodes and IPs of first layers of the remaining network areas are acquired. If a node having the highest quality score is to be served by a network area with "same ISP-province+same ISP-district+same ISP" under the premise that the area bandwidth capacity is met, this network area is directly covered by the same ISP-province node, and the area bandwidth capacity is allocated to each node according to the proportion of the number of IPs of the serving node. This bandwidth value is subtracted from the bandwidth capacity of the related node, and alarm data is sent to a monitoring and alarming module. The monitor data is "network area nodes serving across the ISP-district". The operation of the coverage scheme for the first layer of this network area ends.

d. A network area covered by different ISP nodes is selected for serving.

Serving nodes and IPs of first layer of the remaining network areas of different ISP nodes are acquired, and a node having the highest quality score is acquired. If the area bandwidth capacity is met, this network area is directly covered by a response node, and the area bandwidth capacity is allocated to each node according to the proportion of the number of IPs of the serving node. This bandwidth value is subtracted from the bandwidth capacity of the related node, and alarm data is sent to a monitoring and alarming module. The monitor data is "network area nodes serving across the ISP". The operation of the coverage scheme for the first layer of this network area ends.

Figure 2:
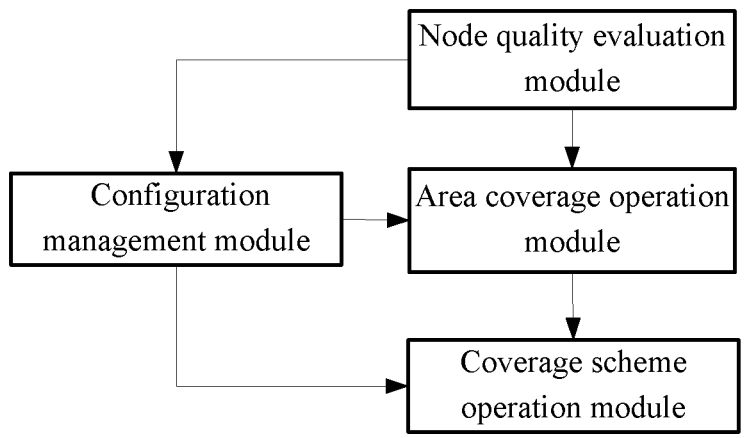
FIG. 2 is a structural diagram of a device for generating a CDN coverage scheme according to an embodiment.

FIG. 2 is a structural diagram of a device for generating a CDN coverage scheme. The device includes:

a configuration management module, configured to: when it is determined that a target area meets node quality re-evaluation conditions, transmit an evaluation task to a node quality evaluation module, transmit node coverage parameters to an area coverage operation module, and transmit area coverage parameters to a coverage scheme operation module;

the node quality evaluation module, configured to calculate, upon receiving the evaluation task, node quality evaluation data in the target area;

the area coverage operation module, configured to calculate an area coverage list according to the node quality evaluation data and the node coverage parameters; and the coverage scheme operation module, configured to generate, according to the area coverage list and the area coverage parameters, a coverage scheme of the target area.

Figure 3:
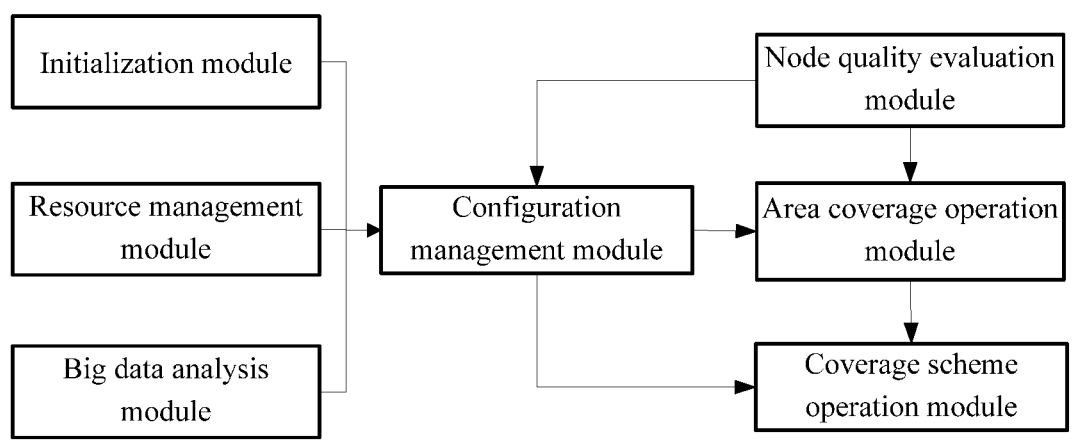
FIG. 3 is another structural diagram of the device for generating a CDN coverage scheme according to an embodiment.

FIG. 3 is another structural diagram of the device for generating a CDN coverage scheme. The device further includes an initialization module, a resource management module and a big data analysis module which are connected to the configuration management module.

The initialization module is configured to transmit CDN coverage scheme initialization information to the configuration management module when it is necessary to perform CDN coverage scheme initialization.

The resource management module is configured to transmit a node configuration task to the configuration management module when there is a newly added node in the target area, wherein the node configuration task contains node configuration change information.

The big data analysis module is configured to transmit a network area reset task to the configuration management module when the service quality of the target area is lower than a preset quality condition.

The node quality evaluation module is configured to calculate node quality evaluation data in the target area by the following method: evaluating IPs of nodes in the target area by a preset evaluation method, calculating quality data of the IPs, calculating an average value of quality data of all IPs subordinate to each node in each network area of the target area to serve as quality evaluation data of each node in this network area, and combining the quality evaluation data of each node to obtain node evaluation data in the target area.

The preset evaluation method and the corresponding IP quality data are at least one of the following:

I. when the evaluation method 1 is to perform PING detection by a detection proxy, the quality data of the IP is a PING parameter;

II. when the evaluation method 2 is to configure the IP to the target area by a third-party test platform to provide service, the quality data of the IP is third-party performance and third-party availability; and III. when the evaluation method 3 is to configure the IP to a preset test link or a preset resource to serve the target area, the quality data of the IP is gray level performance and gray level availability.

The area coverage operation module is configured to calculate an area coverage list according to the evaluation data and node coverage parameters by the following method: determining, according to the evaluation data and node coverage parameters, a servable node list in each network area of the target area, and combining the servable node list and the IP list of each node in the servable node list to form an area coverage list.

The area coverage operation module is configured to determine, according to the evaluation data and node coverage parameters, a servable node list of the target area by one of the following methods.

Method 1

The node coverage parameters include a quality score parameter of each network area, a quality standard of each network area, the minimum number of serving IPs of each network area and a node IP list.

Step 1, step 2 and step 3 are executed for each network area.

Step 1: a quality score of each node in each network area is calculated according to the evaluation data and the quality score parameter of each network area.

Step 2: a coverage node list and a quality score of each network area are acquired according to the quality score of each node in the network area as well as the quality standard of each network area.

Step 3: for a network area with the number of IPs greater than the minimum number of serving IPs of this network area, a node list of the network area and an IP list of each node in the node device list are calculated according to the node list of each network area and the number of IPs of each node in a node device list, and the node quality score is succeeded to the IP list in the node to obtain an area coverage list of this network area.

Method 2

The node coverage parameters include a quality score parameter of each network area, the number of main and backup layers and the quality standard of each network area, the minimum number of serving IPs of each network area and a node IP list.

Step 1, step 2 and step 3 are executed for each network area.

Step 1: a quality score of each node in each network area is calculated according to the evaluation data and the quality score parameter of each network area.

Step 2: a coverage node list and a score of each layer of each network area are acquired according to the quality score of each node in the network area as well as the number of main and backup layers and the quality standard.

Step 3: for a network area with the number of IPs of each layer greater than the minimum number of serving IPs of this network area, a node list of a specified layer of the network area and an IP list of each node in the node device list are calculated according to the node list of each layer of each network area and the number of IPs of each node in the node device list, and the node quality score is succeeded to the IP list in the node to obtain an area coverage list of this network area.

The area coverage parameters include a coverage scheme, area bandwidth capacity and node bandwidth capacity. The coverage scheme operation module is configured to generate, according to the area coverage list and the area coverage parameters, a coverage scheme of the target area by the following method: selecting, in a specified order and from the area coverage list, a node coverage having the highest quality score until the node bandwidth capacity corresponding to the selected node is greater than the area bandwidth capacity, wherein the specified order include provinces of a same ISP, districts of a same ISP, a same ISP and different ISPs.

An embodiment of the present invention further provides a computer-readable storage medium stored with computer programs that, when executed by a processer, implement the steps in the method described above.

An embodiment of the present invention further provides a computer device, including a memory, a processor and computer programs that are stored on the memory and can be run on the processor. When executing the programs, the processor implements the steps in the method described above.

The present invention has the following advantages.

Firstly, the present invention achieves the automatic generation of a CDN coverage scheme; and, one needs only to manually maintain the network server IP list, the network area list, node coverage parameters, area bandwidth capacity, and node bandwidth capacity, in order to automatically compute an optimal coverage scheme. The cost of manual maintenance is reduced by 60%, and efficiency is increased by 100%.

Secondly, the invention also implements a terminal access service quality-based system for evaluating a network-server node coverage network area, improving the service quality by 3%.

The contents described above may be implemented independently or in various combinations, and these variants shall fall into the protection scope of the present invention.

It should be understood by a person of ordinary skill in the art that, all or some of steps in the methods described above may be implemented by instructing hardware by programs. The programs may be stored in a computer-readable storage medium, for example, a read-only memory, a magnetic disk, an optical disk or the like. Optionally, some or all of steps in the foregoing embodiments may also be implemented by one or more integrated circuits. Correspondingly, the modules/units in the foregoing embodiments may be implemented in form of hardware, or may be implemented in form of software functional modules. The present invention is not limited to the combinations of hardware and software in any particular form.

It is to be noted that, as used herein, the term "comprise", "include" or any other variants thereof are intended to cover non-exclusive inclusion. Therefore, an object or device including a series of elements not only includes these elements, but also includes other elements that are not expressly listed or elements inherent to this object or device. Without more limitations, an element defined by the phase "comprising . . . " does not exclude the presence of other identical elements in the object or device including this element.

The foregoing embodiments are merely used for explaining, rather than limiting, the technical solutions of the present invention, and present invention has been described in detail only by preferred embodiments. It should be understood by a person of ordinary skill in the art that modifications or equivalent replacements may be made to the technical solutions of the present invention without departing from the spirit and scope of the technical solutions of the present invention, and these modification and equivalent replacements shall fall into the scope defined by the claims of the present invention.

INDUSTRIAL APPLICABILITY

The embodiments of the present invention provide a method and device for generating a CDN coverage scheme, and a computer-readable storage medium and computer device thereof. The present invention achieves the automatic generation of a CDN coverage scheme; and, one needs only to manually maintain the network server IP list, the network area list, node coverage parameters, area bandwidth capacity, and node bandwidth capacity, in order to automatically compute an optimal coverage scheme. The cost of manual maintenance is reduced by 60%, and efficiency is increased by 100%. The invention also implements a terminal access service quality-based system for evaluating a network-server node coverage network area, improving the service quality by 3%.

What is claimed is:

1. A method for generating a content delivery network (CDN) coverage scheme of a target area, the CDN coverage scheme mapping relationships between network areas and Internet protocol (IP) addresses of network servers, the method comprising:
   determining that the target area meets a node quality re-evaluation condition,
      wherein the target area comprises one or more network areas, and
      wherein the determining performed automatically is based on a current condition of the target area;
   responsive to the determining, calculating node quality evaluation data in the target area;
   calculating an area coverage list according to the node quality evaluation data and one or more node coverage parameters, the area coverage list being associated with the target area and including a plurality of candidate nodes; and
   generating, based on the area coverage list and area coverage parameters, the CDN coverage scheme of the target area, the area coverage parameters comprising a node coverage scheme, an area bandwidth capacity, and a node bandwidth capacity, and generating the coverage scheme of the target area comprising:
      selecting, in a specified order and from the plurality of candidate nodes of the area coverage list, one or more nodes having associated one or more highest quality scores until a total amount of one or more node bandwidth capacities corresponding to the selected one or more nodes is greater than the area bandwidth capacity,
      the specified order being based on quality scores of the plurality of candidate nodes according to the node coverage scheme.

2. The method according to claim 1, wherein determining that the target area meets the node quality re-evaluation condition includes determining at least one of:
   that CDN coverage scheme initialization information is received and the CDN coverage scheme is triggered to execute an initialization task;

that a new node is added to the target area; or that a service quality of the target area is lower than a preset quality condition.

3. The method according to claim 1, wherein calculating the node quality evaluation data in the target area comprises:
evaluating IP addresses of nodes in the target area and calculating quality data of the IP addresses;
for each node, calculating quality evaluation data of the node in each network area of the target area, the quality evaluation data of the node in a network area being an average value of the quality data of the IP addresses managed by the node in the network area, and
combining the quality evaluation data of the nodes to obtain the node quality evaluation data in the target area.

4. The method according to claim 3, wherein evaluating an IP address and calculating the quality data of the IP address include at least one of:
performing PING detection on the IP address by a detection proxy, and calculating PING parameters of the IP address as the quality data of the IP address; or
configuring the IP address to the target area by a third-party test platform to provide service, and calculating third-party performance and third-party availability as the quality data of the IP address.

5. The method according to claim 1, wherein calculating the area coverage list according to the node quality evaluation data and the one or more node coverage parameters comprises:
determining, according to the node quality evaluation data and the one or more node coverage parameters, a servable node list in each network area of the target area; and
combining the servable node list and IP address lists of the nodes in the servable node list to form the area coverage list.

6. The method according to claim 5, wherein:
the one or more node coverage parameters comprise a quality score parameter of each network area, a quality standard of each network area, a minimum number of serving IP addresses of each network area, and a node IP address list; and
determining, according to the node quality evaluation data and the one or more node coverage parameters, the servable node list of a network area comprises:
calculating, according to the node quality evaluation data and the quality score parameter of the network area, a quality score of each node in the network area;
acquiring, according to the quality score of each node in the network area and the quality standard of the network area, a coverage node list and a quality score of the network area; and
in response to a number of IP addresses being greater than the minimum number of serving IP addresses of the network area:
calculating, according to the node list of the network area and a number of IP addresses of each node in a node device list, an IP address list of each node in the node list of the network area and the node device list; and
succeeding the node quality score to the IP address list in the node to obtain an area coverage list of the network area.

7. The method according to claim 5, wherein:
the one or more node coverage parameters comprise a quality score parameter of each network area, a number of main and backup layers and a quality standard of each network area, a minimum number of serving IP addresses of each network area, and a node IP address list; and
determining, according to the node quality evaluation data and the one or more node coverage parameters, the servable node list of a network area comprises:
calculating, according to the node quality evaluation data and the quality score parameter of the network area, a quality score of each node in the network area;
acquiring, according to the quality score of each node in the network area and the number of main and backup layers and the quality standard of the network area, a coverage node list and a score of each layer of the network area; and
in response to a number of IP addresses of each layer being greater than the minimum number of serving IP addresses of the network area:
calculating, according to a node list of each layer of the network area and a number of IP addresses of each node in a node device list, an IP address list of each node in the node list of a specified layer of the network area and the node device list; and
succeeding the node quality score to the IP address list in the node to obtain an area coverage list of the network area.

8. The method according to claim 1, wherein:
the specified order comprises an order of provinces of a same ISP, districts of a same ISP, a same ISP, and different ISPs.

9. A computer device for generating a content delivery network (CDN) coverage scheme of a target area, the CDN coverage scheme mapping relationships between network areas and Internet protocol (IP) addresses of network servers, the device comprising:
a processor; and
a memory storing a computer program that, when executed by the processor, causes the processor to:
determine that the target area meets a node quality re-evaluation condition,
wherein the target area comprises one or more network areas, and
wherein the determining performed automatically is based on a current condition of the target area;
responsive to the determining, calculate node quality evaluation data in the target area;
calculate an area coverage list according to the node quality evaluation data and one or more node coverage parameters, the area coverage list being associated with the target area and including a plurality of candidate nodes; and
generate, based on the area coverage list and area coverage parameters, the CDN coverage scheme of the target area, the area coverage parameters comprising a node coverage scheme, an area bandwidth capacity, and a node bandwidth capacity, and generating the coverage scheme of the target area comprising:
selecting, in a specified order and from the plurality of candidate nodes of the area coverage list, one or more nodes having associated one or more highest quality scores until a total amount of one or more node bandwidth capacities corresponding to the selected one or more nodes is greater than the area bandwidth capacity, the specified order being based on quality scores of the plurality of candidate nodes according to the node coverage scheme.

10. The computer device according to claim 9, wherein the computer program further causes the processor to determine that the target area meets the node quality re-evaluation condition by determining at least one of:
that CDN coverage scheme initialization information is received and the CDN coverage scheme is triggered to execute an initialization task;
that a new node is added to the target area; or
that a service quality of the target area is lower than a preset quality condition.

11. The computer device according to claim 9, wherein the computer program further causes the processor to calculate the node quality evaluation data in the target area by:
evaluating IP addresses of nodes in the target area and calculating quality data of the IP addresses;
for each node, calculating quality evaluation data of the node in each network area of the target area, the evaluation data of the node in a network area being an average value of the quality data of the IP addresses managed by the node in the network area, and
combining the quality evaluation data of the nodes to obtain the node quality evaluation data in the target area.

12. The computer device according to claim 11, wherein the computer program further causes the processor to evaluate an IP address and calculating the quality data of the IP address by at least one of:
performing PING detection on the IP address by a detection proxy, and calculating PING parameters of the IP address as the quality data of the IP address; or
configuring the IP address to the target area by a third-party test platform to provide service, and calculating third-party performance and third-party availability as the quality data of the IP address.

13. The computer device according to claim 9, wherein the computer program further causes the processor to calculate the area coverage list according to the node quality evaluation data and the one or more node coverage parameters by:
determining, according to the node quality evaluation data and the one or more node coverage parameters, a servable node list in each network area of the target area; and
combining the servable node list and IP address lists of the nodes in the servable node list to form the area coverage list.

14. The computer device according to claim 13, wherein:
the one or more node coverage parameters comprise a quality score parameter of each network area, a quality standard of each network area, a minimum number of serving IP addresses of each network area, and a node IP address list; and
the computer program further causes the processor to determine, according to the node quality evaluation data and the one or more node coverage parameters, the servable node list of a network area by:
calculating, according to the node quality evaluation data and the quality score parameter of the network area, a quality score of each node in the network area;
acquiring, according to the quality score of each node in the network area and the quality standard of the network area, a coverage node list and a quality score of the network area; and
in response to a number of IP addresses being greater than the minimum number of serving IP addresses of the network area:
calculating, according to the node list of the network area and a number of IP addresses of each node in a node device list, an IP address list of each node in the node list of the network area and the node device list; and
succeeding the node quality score to the IP address list in the node to obtain an area coverage list of the network area.

15. The computer device according to claim 13, wherein:
the one or more node coverage parameters comprise a quality score parameter of each network area, a number of main and backup layers and a quality standard of each network area, a minimum number of serving IP addresses of each network area, and a node IP address list; and
the computer program further causes the processor to determine, according to the node quality evaluation data and the one or more node coverage parameters, the servable node list of a network area by:
calculating, according to the node quality evaluation data and the quality score parameter of the network area, a quality score of each node in the network area;
acquiring, according to the quality score of each node in the network area and the number of main and backup layers and the quality standard of the network area, a coverage node list and a score of each layer of the network area; and
in response to a number of IP addresses of each layer being greater than the minimum number of serving IP addresses of the network area:
calculating, according to a node list of each layer of the network area and a number of IP addresses of each node in a node device list, an IP address list of each node in the node list of a specified layer of the network area and the node device list; and
succeeding the node quality score to the IP address list in the node to obtain an area coverage list of the network area.

16. The computer device according to claim 9, wherein:
the specified order comprises an order of provinces of a same ISP, districts of a same ISP, a same ISP, and different ISPs.

17. A non-transitory computer-readable storage medium storing a computer program for generating a content delivery network (CDN) coverage scheme of a target area, the CDN coverage scheme mapping relationships between network areas and Internet protocol (IP) addresses of network servers, and the computer program, when executed by a processor, causing the processor to:
determine that the target area meets a node quality re-evaluation condition,
wherein the target area comprises one or more network areas, and
wherein the determining performed automatically is based on a current condition of the target area;
responsive to the determining, calculate node quality evaluation data in the target area;
calculate an area coverage list according to the node quality evaluation data and one or more node coverage parameters, the area coverage list being associated with the target area and including a plurality of candidate nodes; and generate, based on the area coverage list and area coverage parameters, the CDN coverage scheme of the target area, the area coverage parameters comprising a node coverage scheme, an area bandwidth capacity, and a node bandwidth capacity, and generating the coverage scheme of the target area comprising:

selecting, in a specified order and from the plurality of candidate nodes of the area coverage list, one or more nodes having associated one or more highest quality scores until a total amount of one or more node bandwidth capacities corresponding to the selected one or more nodes is greater than the area bandwidth capacity, the specified order being based on quality scores of the plurality of candidate nodes according to the node coverage scheme.

* * * * *